Dec. 31, 1946.  W. H. GRINNELL  2,413,619
MACHINE FOR GRINDING ORTHODONTIC MODELS
Filed Oct. 31, 1945  2 Sheets-Sheet 1
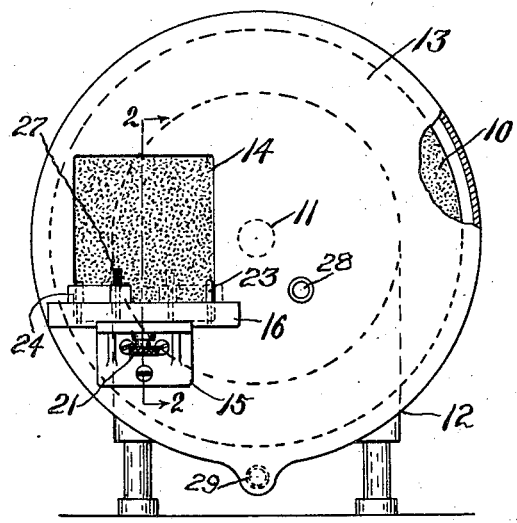
Fig. 1.
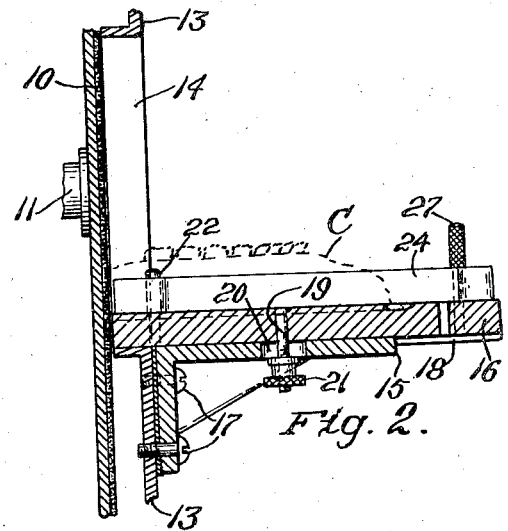
Fig. 2.
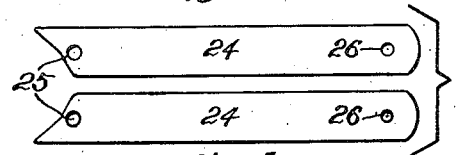
Fig. 5.
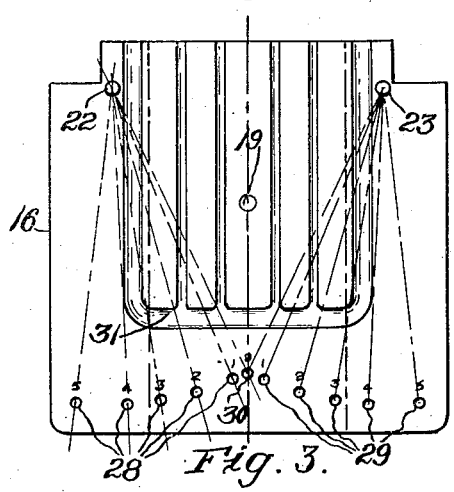
Fig. 3.
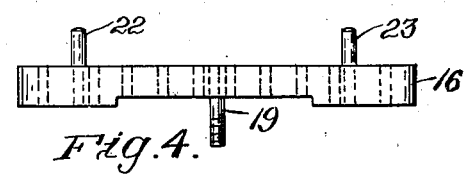
Fig. 4.
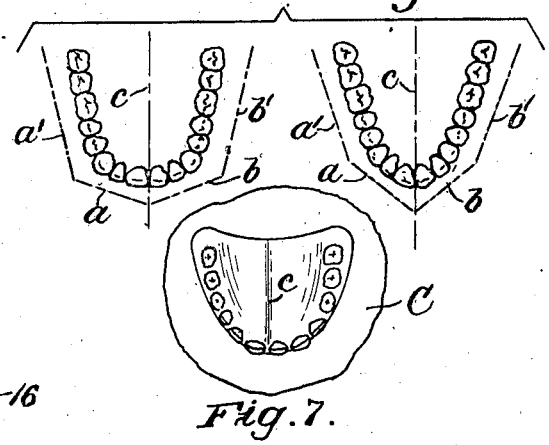
Fig. 6.
Fig. 7.
INVENTOR.
Willis H. Grinnell,
BY
Arthur F. Randall, atty.

Dec. 31, 1946. W. H. GRINNELL 2,413,619
MACHINE FOR GRINDING ORTHODONTIC MODELS
Filed Oct. 31, 1945 2 Sheets—Sheet 2

INVENTOR.
Willis H. Grinnell,
BY
Arthur F. Randall, atty.

Patented Dec. 31, 1946

2,413,619

UNITED STATES PATENT OFFICE 2,413,619

MACHINE FOR GRINDING ORTHODONTIC MODELS

Willis H. Grinnell, Newton Center, Mass.

Application October 31, 1945, Serial No. 625,829

3 Claims. (Cl. 51—240)

This invention relates to grinding machines of that class which are employed in the practice of dental orthopedics to shape the models or plaster casts such as made at intervals during treatment and used as guides in straightening the teeth.

The invention has for its object to provide an improved grinding machine of the class described which will to a great extent dispense with the necessity of grinding to lines scribed on the plaster models; which will enable the models to be accurately and appropriately shaped to suit the type of occlusion of each patient; by means of which the angular relationship of the various facets of the shaped model may be accurately produced on both the upper and lower sections of the latter, and by means of which the several models of one individual made over a period of months or years may be made all of one size and shape so that they are exactly alike.

To these ends I have provided an improved model-grinding machine which, in the preferred embodiment of the invention, may be constructed and operate as set forth in the following description, the several novel features of the invention being particularly pointed out and defined in the claims at the close of the description.

In the accompanying drawings:

Figure 1 is a front view of a model-grinding machine constructed in accordance with this invention.

Figure 2 is a section on line 2—2 of Fig. 1.

Figure 3 is a top plan view of the work-supporting shelf hereinafter described.

Figure 4 is a front edge view of the top plate or member of the work-supporting shelf.

Figure 5 shows the pair of gauge bars hereinafter described.

Figure 6 illustrates two extreme types of normal dental arches.

Figure 7 is a plan view of an orthodontic model or plaster cast before being shaped.

Figure 8:
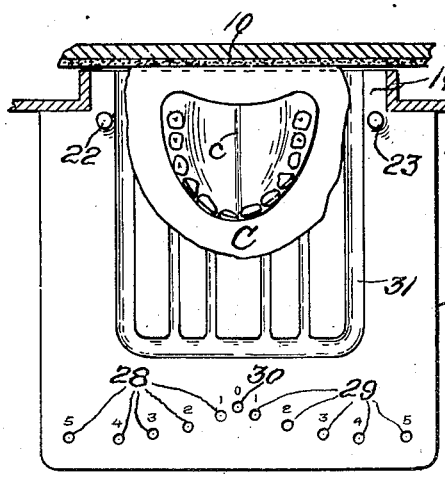
Figures 8, 9, 10 and 11 illustrate the manner in which the model or cast of Fig. 7 is shaped by the machine.

As shown in Fig. 6 the teeth of normal dental arches in the average mouth actually are disposed in a series of comparatively straight lines or rows, usually four, which are approximately parallel with the proximate broken lines $a$, $a'$ and $b$, $b'$, the angularity of the lines $a$, $a'$ relatively to the medial line $c$ of a normal symmetrical arch being a counterpart of the angularity of the lines $b$, $b'$. In conformity with this it has been the practice with dental orthopedists to grind away the base of each model or cast C to provide the same with facets 1, 1 and 2, 2 (Fig. 12) paralleling the rows of teeth, and with a facet 3 at the heel or rear end that is perpendicular to the medial line $c$ of the arch and approximately equidistant from the two rear molars. These grinding operations have heretofore been carried out by means of a grinding machine comprising an abrasive wheel and a work-supporting shelf adjacent to the latter by which the model or cast was supported while being operated upon, no means being heretofore provided, so far as I know, for determining the angularity of the facets other than lines scribed upon the model and the operator's judgement.

In treating a patient over a long period of time several models of both upper and lower teeth will be made at intervals during the treatment period and preparatory to grinding the base of each cast or model to shape the same it has heretofore been the practice to mark the top of the base with lines to indicate to the operator the positions of the facets, said lines being the only guide during the grinding operations. As a result irregularities occurred in the size and shape of the different models of a set or series which was obviously highly objectionable and undesirable. My invention obviates this objectionable feature characterizing the means and methods heretofore employed in shaping orthodontic models and provides for accurate and expeditious performance of the necessary operations.

Grinding machines of the class referred to have heretofore been provided comprising an abrasive wheel or disk 10 (Figs. 1 and 2) fast on a shaft 11 rotatably supported in bearings provided upon a frame 12 adapted to be seated upon a table, bench or other supporting fixture. The shaft 11 of the machine is driven by a motor (not shown) while the frame 12 is made with a housing inclosing the wheel or disk 10, said housing including a flat front wall 13 made adjacent to one side thereof with a rectangular window 14 into which the model or cast, while supported by a shelf projecting from front wall 13, is introduced for engagement with the abrasive wheel or disk 10. To the extent just described the machine herein shown is constructed as heretofore.

In accordance with the present invention I provide the front side of wall 13 with a work-supporting shelf adjacent to the lower end of window 14, said shelf comprising an angular flanged lower bracket member 15 (Figs. 1 and 2) and a horizontal top plate member 16. One of the flanges of bracket member 15 is fitted against wall 13 and formed with apertures for screws 17 by which it is fixed in position. The other flange of member 15 is disposed horizontally and slidably fitted within a groove 18 provided in the bottom face of top plate 16 so as to hold the latter rigidly in position against sidewise displacement.

The top plate 16 includes as a fixed part thereof a depending stem 19 which extends downwardly through a slot 20 provided in the horizontal flange of bracket 15, said slot being parallel with groove 18 and said stem having its lower end portion threaded to receive upon it a thumb nut 21 by means of which the top plate is normally fixedly clamped to bracket 15, but with provision for adjustment of the top plate toward and from the abrasive wheel or disk 10 when said nut is loosened.

Projecting upwardly from top plate 16 are two pivot posts 22 and 23 (Figs. 3 and 4) disposed adjacent to the opposite sides of window 14 as shown in Fig. 8. Each pivot post is adapted to receive upon it one of a pair of gauge bars 24 (Fig. 5) each of which is made adjacent to its one end with a cylindrical hole 25 to receive the pivot post and adjacent to its opposite end with a cylindrical hole 26 to receive a dowel pin 27 that is removably fitted therein.

The outer free end portion of top plate 16 is made with two arcuate groups or series of vertical sockets 28 and 29 (Figs. 3 and 8) and with a single socket 30 disposed midway between said two groups or series. The distance between each socket 28 and post 22 is the same as the distance between the holes 25 and 26 (Fig. 5) of the gauge bars 24 and it will therefore be clear that when one of the gauge bars is engaged with the pivot post 22 the hole 26 thereof may be brought into register with either socket 28 and secured in that position by a dowel pin 27. Likewise, the distance between each socket 29 and pivot post 23 is also the same as the distance between the holes 25 and 26 of the gauge bars so that when one of the latter is engaged with the pivot post 23 the hole 24 of that gauge bar may be brought into register with either socket 29 and secured in that position by a dowel pin 27. The single socket 30 (Fig. 8) occupies a position midway between the two groups 28 and 29 and its distance from each pivot post 22 and 23 is the same as the distance between the holes 25 and 26 of the gauge bars. Thus the sockets 28—30 constitute an arcuate group that is concentric with pivot post 22 while the sockets 29—30 constitute a counterpart arcuate group that is concentric with pivot post 23. This construction provides for fixing either gauge bar in position upon the top plate 16 where its straight inner side is disposed at a selected or predetermined angle with respect to the plane of the abrasive wheel 10.

The sockets of each group 28 and 29 are numbered from 1 to 5 starting with the socket nearest the socket 30, said numbers being imposed upon the shelf plate 16 as shown, while the mark "0" may be provided on said plate adjacent to the socket 30. The angular distances between socket 30 and any two sockets of groups 28 and 29 which are numbered alike are the same.

Figure 12:
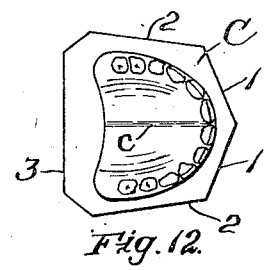
Figure 12 is a plan view of the finished model or cast.
Figure 13:
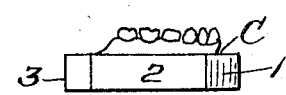
Figure 13 is a side view of the finished model or cast shown in Fig. 12.

The unfinished model or cast C of Fig. 7, for example, is reduced to the shape shown in Fig. 12 as follows: While the model is manually held in position upon the top of plate 16 with its medial line c perpendicular to the front face of wheel 10, the rear end or heel of the model is pressed against the abrasive wheel 10 (Fig. 8) until the facet 3 is properly completed at a chosen distance from the two rearmost molars.

Figure 9:
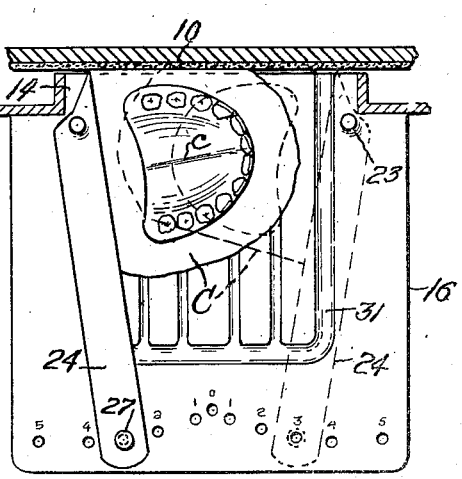

Then one of the gauge bars 24 is placed in position upon the pivot post 22 and secured by dowel 27 in a position where it is disposed at the desired angle relatively to wheel 10, said dowel being shown in Fig. 9 as being fitted into socket #3 of group 28. The model C is now placed upon top plate 16 with its facet 3 fitted against the gauge bar and is slid along the latter toward and against wheel 10 until one of the side facets 2 (Fig. 12) has been properly completed at the chosen distance from the teeth of the model.

Then the other gauge bar 24 is fitted upon pivot post 23 as indicated by dotted lines in Fig. 9 where it is held in position by dowel 27 occupying socket #3 of group 29. While the gauge bar indicated by dotted lines in Fig. 9 is secured in this position the facet 3 of the model is fitted against the same and the model is slid along the gauge bar into engagement with the abrasive wheel to form the opposite side facet 2 (Fig. 12).

Figure 10:
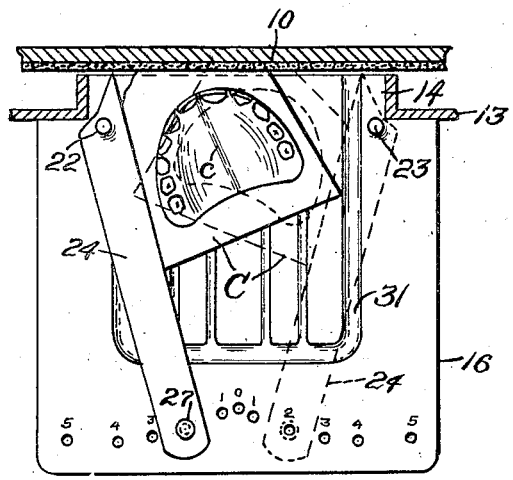

One of the gauge bars 24 is now secured in position upon the top plate 16 as shown by full lines in Fig. 10 where it is held in position by dowel 27 occupying socket #2 of group 28 and while the model C is held with one of the facets 2 against the gauge bar it is slid along the latter into engagement with the abrasive wheel 10 until one of the front end facets 1 is properly formed. The other front end facet 1 is similarly formed while utilizing the other gauge bar while the latter is secured in the position indicated by dotted lines (Fig. 10) by means of dowel 27 which at this time is fitted into socket #2 of group 29.

Figure 11:
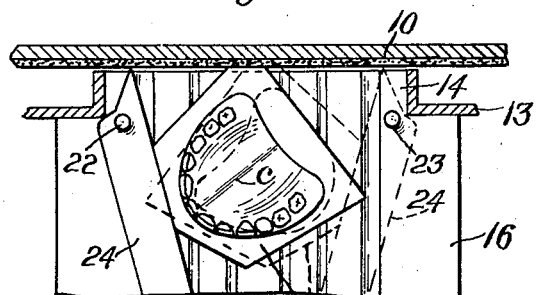

This completes the shaping of the model with the exception of removing the sharp corners at the opposite ends of facet 3 which is accomplished as illustrated in Fig. 11 where the facets 1 are held in engagement with first one gauge bar 24 as illustrated by full lines and then with the other gauge bar 24 as illustrated by dotted lines while the model is brought into engagement with the abrasive wheel.

As will be clear, the described construction provides for fixing each gauge bar at different angles relatively to the plane of the abrasive wheel where it is appropriately positioned for arches of different types or shapes.

Also, instead of two gauge bars I may employ but one which, if rectangular in cross-section as shown, may be transferred from one pivot post to the other.

As heretofore, the portion of the frame 12 which houses the abrasive wheel 10 is made with ports 28 and 29, port 28 being connected with a supply of water and serving to deliver a stream of the latter on to wheel 10 and the port 29 serving as a drain by means of which the sludge resulting through use of the machine is exhausted from within the housing portion of frame 12.

The top side of shelf plate 16 may be made with channels or grooves 31 into which sludge which may collect upon said shelf plate is swept by the model as the latter is moved about and by which said sludge is delivered into the housing.

What I claim is:

1. In a model-grinding machine of the class described, the combination with the abrasive disk rotatable on a horizontal axis, of a horizontal shelf fixedly supported in proximity to the model-engaging face of said disk and on which the models are manually held while slid into engagement with said face; two spaced-apart pivot posts projecting upwardly from said shelf in front of said disk; a straight gauge bar seated upon said shelf and made adjacent to its one end with an aperture adapted to be occupied by one of said posts thereby to pivotally and separably connect said bar with said shelf so that it can be adjusted angularly to vary its angular relationship to said disk; means for securing said gauge bar in each of its different angular positions, said means consisting of an arcuate series of angularly spaced apart sockets that is concentric with the pivot post on which said gauge bar is mounted and a dowel that is removably fitted within a hole provided in said gauge bar and projects into one of said sockets to hold said gauge bar in its adjusted position, said gauge bar serving through engagement with a facet of a model to maintain said facet at a predetermined angle relatively to said disk while the model is being operated upon by said disk.

2. In a model grinding machine of the class described, the combination with the abrasive disk rotatable on a horizontal axis, of a horizontal shelf fixedly supported in proximity to the model-engaging face of said disk and on which the models are manually held while slid into engagement with said face; two spaced-apart pivot posts projecting upwardly from said shelf in front of said disk; a straight gauge bar seated upon said shelf and made adjacent to its one end with an aperture adapted to be occupied by one of said posts thereby to pivotally and separably connect said bar with said shelf so that it can be adjusted angularly to vary its angular relationship to said disk; means for securing said gauge bar in each of its different angular positions, said means consisting of two arcuate series of angularly spaced apart sockets whereof one series is concentric with one of said posts and the other series is concentric with the other post, and a dowel that is fitted within a hole provided through said gauge bar with its inner end portion occupying one of said sockets to hold the gauge bar in its adjusted position, said gauge bar serving through engagement with a facet of a model to maintain said facet at a predetermined angle relatively to said disk while the model is being operated upon by said disk.

3. In a model-grinding machine of the class described, the combination with the abrasive disk rotatable on a horizontal axis, of a horizontal shelf fixedly supported in proximity to the model-engaging face of said disk and on which the models are manually held while slid into engagement with said face; two spaced-apart pivot posts projecting upwardly from said shelf in front of said disk; a straight gauge bar seated upon said shelf and made adjacent to its one end with an aperture adapted to be occupied by one of said posts thereby to pivotally and separably connect said bar with said shelf so that it can be adjusted angularly to vary its angular relationship to said disk; means for securing said gauge bar in each of its different angular positions, said means consisting of two series of angularly spaced apart sockets one of which series is formed in said shelf around one of said posts and the other of which is formed in said shelf around the other post, and a dowel that is removably fitted within a hole provided in said gauge bar and projects into one of said sockets to hold said gauge bar in its adjusted position, said gauge bar serving through engagement with a facet of a model to maintain said facet at a predetermined angle relatively to said disk while the model is being operated upon by said disk.

WILLIS H. GRINNELL.